United States Patent [19]

Ikeda et al.

[11] 4,226,925

[45] Oct. 7, 1980

[54] BATTERY WITH INTERNAL ELECTRICAL CONNECTOR

[75] Inventors: Hironosuke Ikeda, Hirakata; Satoshi Narukawa, Kobe, both of Japan

[73] Assignee: Sanyo Electric Co., Ltd., Osaka, Japan

[21] Appl. No.: 12,731

[22] Filed: Feb. 16, 1979

[30] Foreign Application Priority Data

| Mar. 8, 1978 | [JP] | Japan | 53-80558[U] |
| Jun. 14, 1978 | [JP] | Japan | 53-83336[U] |
| Jun. 14, 1978 | [JP] | Japan | 53-83337[U] |
| Jun. 16, 1978 | [JP] | Japan | 53-83778[U] |
| Jun. 16, 1978 | [JP] | Japan | 53-83779[U] |
| Jul. 26, 1978 | [JP] | Japan | 53-103907[U] |

[51] Int. Cl.$^2$ .......................................... H01M 2/26
[52] U.S. Cl. ................................................. 429/161
[58] Field of Search ........................ 429/161, 152, 153

[56] References Cited

U.S. PATENT DOCUMENTS

| 478,485 | 7/1892 | Waldron | 429/161 |
| 1,028,614 | 6/1912 | Schoenmehl | 429/161 |
| 3,059,041 | 10/1962 | Vogt | 429/59 |
| 3,094,438 | 6/1963 | Daley et al. | 429/161 |
| 3,490,954 | 1/1970 | Babusci et al. | 429/161 |
| 3,852,110 | 12/1974 | Deckfeldt | 429/162 |

*Primary Examiner*—Donald L. Walton
*Attorney, Agent, or Firm*—Armstrong, Nikaido, Marmelstein & Kubovcik

[57] ABSTRACT

The present invention discloses a battery in which a plurality of positive and negative electrodes are alternately superposed, with each of separator layers therebetween, in the form of flat package. Through-bores are centrally defined in the electrode having one polarity interposed between a pair of electrodes having the other polarity, and both separator layers sandwiching said electrode having said one polarity. Passed through these central bores is an electrical contact member, of which at least the portion in contact with said electrode having said one polarity, is coated with insulating material. Said pair of electrodes having said other polarity are therefore electrically connected to each other by said electrical contact member. Thus, electric contact between the electrodes having a same polarity may simply be provided, internal short-circuit in the battery may be prevented and the assembling of the battery may be facilitated.

16 Claims, 15 Drawing Figures

BATTERY WITH INTERNAL ELECTRICAL CONNECTOR

BACKGROUND OF THE INVENTION

Conventional flat battery in which a plurality of positive and negative electrodes are alternately superposed with separator layers therebetween, has been constructed in such a manner that two electrodes having a same polarity are connected to each other by a current collector member in the shape of a pair of glasses, and one of the pair of negative electrodes is superposed on one of the pair of positive electrodes with a separator layer therebetween and the other one of the pair of positive electrodes is then turned to be superposed on said one of the pair of negative electrodes with a separator layer therebetween and the other one of the pair of negative electrodes is then turned to be superposed on said other one of the pair of positive electrodes with a separator layer therebetween.

Therefore, there has been a possibility of internal short-circuit due to positional shifting of the electrodes or separator layers during the assembling, thereby to require a highly accurate assembling work. In addition, the assembling itself has been extremely complicated.

OBJECTS OF THE INVENTION

It is an object of the present invention to provide a battery in which electrical contact between the electrodes having a same polarity is simply provided.

It is another object of the present invention to provide a battery in which the occurrence of internal short-circuit due to positional shifting of electrodes or separator layers is prevented.

It is a further object of the present invention to provide a battery in which the assembling is simplified, thereby to improve the working efficiency.

It is still another object of the present invention to provide a battery in which the current collecting effect is enhanced.

BRIEF DESCRIPTION OF THE DRAWINGS

The present invention will be further described by way of example with reference to the accompanying drawings, in which.

Similar reference numerals denote similar parts in the different views.

DETAILED DESCRIPTION OF THE PREFERRED EMBODIMENTS

Figure 1:
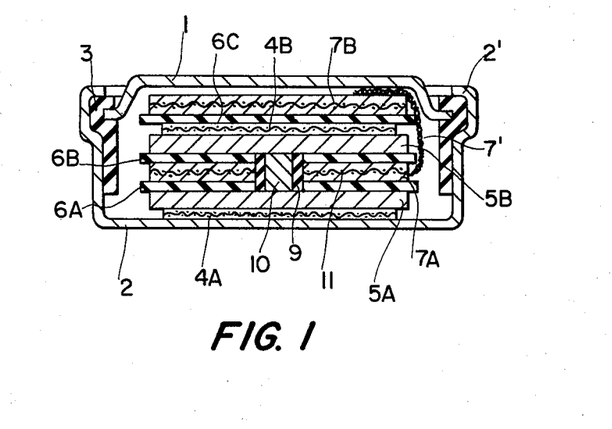
FIG. 1 is a section view of a first embodiment of a battery in accordance with the present invention.
Figure 2:
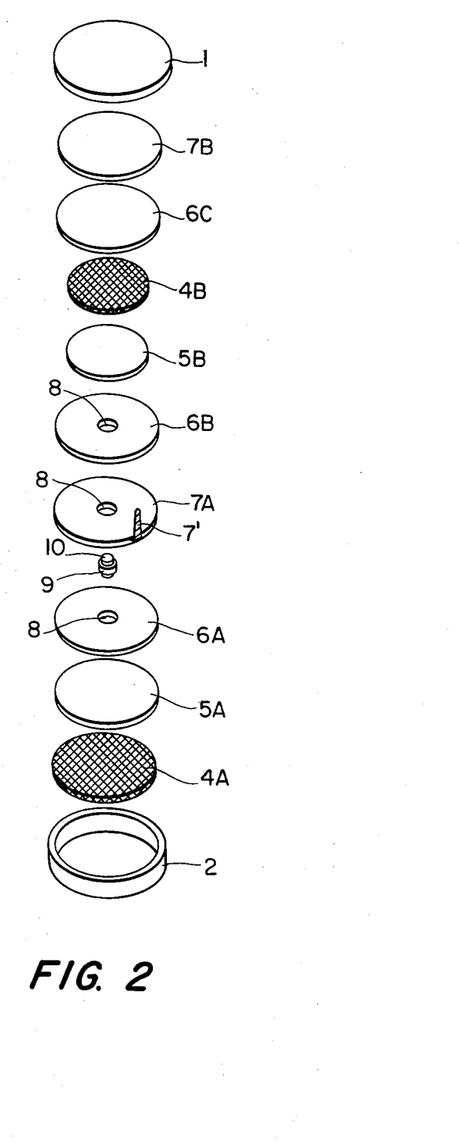
FIG. 2 is a disassembled perspective view of the battery constituting elements of FIG. 1.

A first embodiment will be discussed by referring to FIGS. 1 and 2 illustrating a flat lithium battery.

Through an insulating packing 3, a closure cover 1 which simultaneously forms the terminal of a positive pole, is sealed to a battery vessel 2 by turning into the C-shape the edge 2' of the opening of the battery vessel 2, which simultaneously forms the terminal of a negative pole. Thus, an element housing space is provided between the closure cover 1 and the vessel 2. A first negative electrode collector member 4A made of a stainless steel net is spot-welded to the inner surface of the bottom of the vessel 2. Superposed on this negative electrode collector member 4A are a first negative electrode 5A, a separator layer 6A, a first positive electrode 7A and a separator layer 6B.

Central bores 8 in a same shape are defined in the separator layers 6A and 6B, and the first positive electrode 7A. Passed through these central bores 8 is an electrical contact member 10 made of a conductive bar, of which at least the portion in contact with the first positive electrode 7A is coated with a cylindrical insulating member 9.

Further superposed on the separator layer 6B are a second negative electrode 5B, a second negative electrode collector member 4B, a separator layer 6C, and a second positive electrode 7B, and then positive electrode collector tab 7' connected to and projected from the first positive electrode 7A is placed onto the second positive electrode 7B. At the time of closing the opening of the vessel 2, this positive electrode collector tab 7' is contact-pressed to the inner surface of the closure cover 1, whereby electrical contact is provided between the closure cover 1 and the positive electrode 7A. The separator layers are impregnated with a predetermined amount of an electrolyte during the assembling.

The first and second negative electrodes 5A and 5B are made as stamped out from a rolled lithium plate. The first and second positive electrodes 7A and 7B are made in such a way that a conductive agent and a viscous liquid are added to active material of manganese dioxide so as to form paste, which is subsequently applied to the positive electrode collector member 11, which is then finally dried.

The insulating member 9 may be made of polypropylene resin, polyethylene resin or the like.

According to the battery of the first embodiment, the central bores 8 are defined in a pair of separator layers 6A and 6B and the positive electrode 7A which are interposed between a pair of negative electrodes 5A and 5B, and the electrical contact member 10 of which at least the portion in contact with the positive electrode 7A is coated with the insulating member 9, is passed through these central bores 8, whereby this electrical contact member 10 prevents a plurality of electrodes to be positionally shifted thereby to prevent internal short-circuit, and permits a pair of negative electrodes 5A and 5B to be electrically connected to each other.

It is to be noted that the negative electrodes 5A and 5B may also be made of soft and light metal plates such as magnesium, sodium or the like, besides lithium.

Figure 3:
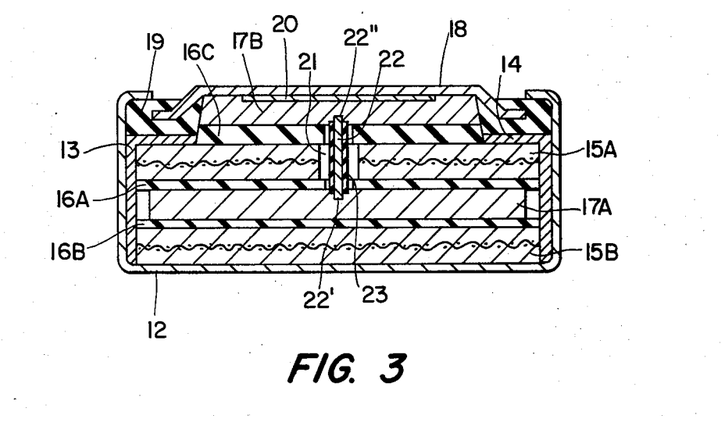
FIG. 3 is a section view of a second embodiment of the present invention.
Figure 4:
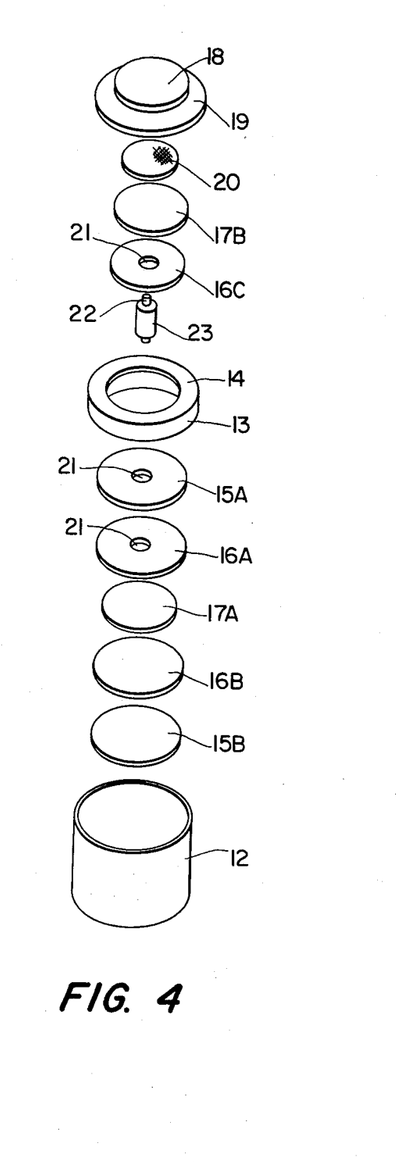
FIG. 4 is a disassembled perspective view of FIG. 2.

A second embodiment of the present invention will be discussed referring to FIGS. 3 and 4.

A battery vessel 12 simultaneously forming the terminal of a positive pole may be made of stainless steel. A cylindrical conductive case 13 simultaneously forming a positive electrode collector member, is provided at one opening thereof with an inwardly turned flange 14.

Disposed in the conductive case 13 are a pair of first and second positive electrodes 15A and 15B having such a diameter as to closely contact with the inner wall surface of the conductive case 13 and a first negative electrode 17A having a diameter smaller than that of the positive electrodes 15A and 15B, this first negative electrode 17A being sandwiched between the separator layers 16A and 16B. The pair of the positive electrodes 15A and 15B are electrically contacted to each other by means of the conductive case 13, which is fitted into the battery vessel 12, whereby electrical contact is provided between the conductive case 13 and the battery vessel 12 by the contact thereof. It is to be noted that the first negative electrode 17A has such a diameter as not to become in contact with the conductive case 13.

An insulating packing 19 is integrally disposed at the peripheral edge of a closure cover 18 which simultaneously forms the terminal of a negative pole. A negative electrode collector net 20 made of stainless steel is securely fixed to the inner surface of the closure cover 18 by spot-welding. A second negative electrode 17B is contact-pressed to the negative electrode collector net 20 in the concaved space defined by the plane portion of the closure cover 18 and the insulating packing 19. This second negative electrode 17B is superposed on the first positive electrode 15A with a separator layer 16C therebetween.

Central bores 21 are defined in the first positive electrode 15A and the separator layers 16A and 16C. Passed through these central bores 21 is an electrical contact member 22, of which at least the portion in contact with the positive electrode 15A is coated with an insulating member 23. The both ends 22' and 22" of the electrical contact member 22 terminate in the first and second negative electrodes 17A and 17B, respectively.

With the conductive case 13 fitted into the battery vessel 12, the insulating packing 19 disposed at the periphery of the closure cover 18 is placed onto the flange 14 of the conductive case 13. The battery vessel 12 is then closed by turning inwardly the opening edge thereof. The other end 22" of the electrical contact member 22 of which one end 22' terminates in the first negative electrode 17A, is then forcibly entered into the second negative electrode 17B, whereby a pair of negative electrodes 17A and 17B are electrically connected to each other by means of the electrical contact member 22.

According to the battery of the second embodiment of the present invention, the positive electrodes 15A and 15B having such a diameter as to closely contact with the inner wall surface of the cylindrical conductive case 13, are electrically connected to each other by means of the conductive case 13, and the negative electrodes 17A and 17B having a smaller diameter than that of the positive electrode 15A or 15B are electrically connected to each other by means of the electrical contact member 22 which is passed through the central bores 21 defined in the large diameter positive electrode 15A and the separator layers 16A and 16C. Such construction is therefore very simple as compared with a conventional battery in which the assembling has been made after a pair of electrodes having a same polarity were electrically connected to each other in advance by a conductive member. Namely, according to the present invention electrical contact between the electrodes having a same polarity may be provided only by superposing in succession each of individually formed positive and negative electrodes, thereby to simplify the assembling work to a great extent.

The electrical contact member 22 disposed at the center positions of the electrodes prevents such electrodes from positionally shifting, thereby to prevent internal short-circuit.

A battery vessel simultaneously forming the terminal of one pole may also be used as a cylindrical conductive case, although the cylindrical conductive case 13 has been shown as fitted into the battery vessel 12 in the second embodiment above-mentioned.

It is to be noted that the present invention may also be applied to alkaline batteries other than nonaqueous batteries as shown in the first and second embodiments.

A third embodiment of the present invention will be discussed by referring to FIGS. 5 and 6.

This third embodiment differs from the second embodiment shown in FIGS. 3 and 4, in the following points.

This third embodiment is similarly constructed as the second embodiment in which the negative electrode collector net 20 is securely spot-welded to the inner surface of the closure cover 18, and the second negative electrode 17B and the separator layer 16C are contact-pressed to the negative electrode collector net 20 within the concave space defined by the plane portion of the closure cover 18 and the insulating packing 19. In the third embodiment, however, a third positive electrode 15C is contact-pressed to the separator layer 16C and housed in said concaved space. This third positive electrode 15C is contact-pressed to the first positive electrode 15A in the conductive case 13 through a resilient conductive plate 24, whereby electrical contact is provided between the first positive electrode 15A and the third positive electrode 15C. The central bores 21 are also defined in the third positive electrode 15C and the conductive plate 24. The electrical contact member 22 is passed through these central bores 21 and the ends 22' and 22" of the electrical contact member 22 are in contact with or terminate in the pair of negative electrodes 17A and 17B, respectively.

A battery of the third embodiment will be assembled as described in the following.

Figure 6:
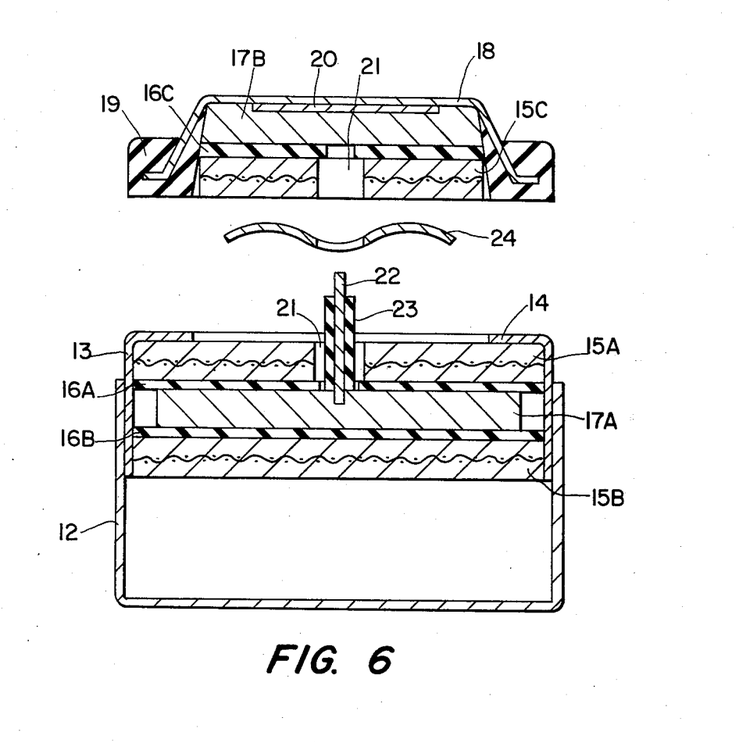
FIG. 6 is a section view, illustrating the assembling process of the battery shown in FIG. 5.

As shown in FIG. 6, the first negative electrode 17A sandwiched between the separator layers 16A and 16B is held by and between the first and second positive electrodes 15A and 15B, which is subsequently fitted into the conductive case 13. The electrical contact member 22 is passed through the central bore 21 in the first positive electrode 15A and is then contact-pressed to the first negative electrode 17A. Thus assembled elements are then fitted into the battery vessel 12. The conductive plate 24 is then placed on the first positive electrode 15A. On the other hand, the second negative electrode 17B and the third positive electrode 15C with the separator layer 16C therebetween are housed in the concaved space defined by the plane portion of the closure cover 18 and the insulating packing 19. Thus assembled closure cover 18 is then placed on the flange 14 of the conductive case 13. Finally, the peripheral edge of the opening of the battery vessel 12 is inwardly turned to securely close the closure cover 18, whereby a completed battery is produced.

In the batteries of the type using a rolled lithium plate for the negative electrodes 17A and 17B as in the third embodiment discussed hereinbefore, the negative electrodes 17A and 17B are very thin, but the insulating packing 19 may not be formed so thinly, because the closing structure has to be sufficiently rigid so as to be put into practice. Accordingly, when only the negative electrode 17B made of a rolled lithium plate is disposed in the concaved space defined by the closure cover 18 and the insulating packing 19 at the periphery thereof, a large vacant space is then formed, which is disadvantageous in view of the volumetric efficiency. In the battery constructed according to the third embodiment, however, the negative electrode 17B is disposed together with the positive electrode 15C, thereby to improve the volumetric efficiency.

Where lithium is used as negative electrode active material and manganese dioxide is used as positive electrode active material as shown in the third embodiment, a state of their electrical chemical equilibrium is provided when the ratio by volume of the lithium pole to the manganese dioxide pole is about 1:2. Accordingly, the ratio of the thickness of the positive electrode interposed between the pair of negative electrodes to that of the positive electrode located at the end of the laminated electrode group, will be about 2:1, if this pair of positive electrodes have a same diameter. However, it requires extremely complicated operations to manufacture positive electrodes having different thicknesses, since the positive electrodes are made, as mentioned earlier, according to the powder-pressed method or the pasted method.

Figure 5:
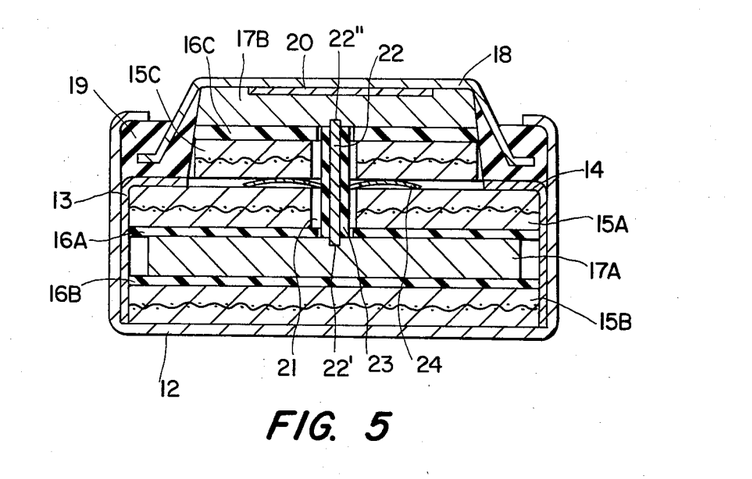
FIG. 5 is a section view of a third embodiment of the present invention.

In this third embodiment, however, it may be sufficient only to adjust the ratio of the thickness of the first negative electrode 17A to the second negative electrode 17B, to about 2:1, if the first, second and third positive electrodes 15A, 15B and 15C have a same thickness as shown in FIG. 5. Namely, the negative electrodes 17A and 17B are made of a rolled lithium plate, and the adjustment of the thickness of such negative electrodes is therefore made much easier than that for positive electrodes, thereby to improve the battery manufacturing efficiency to a great extent.

Figure 7:
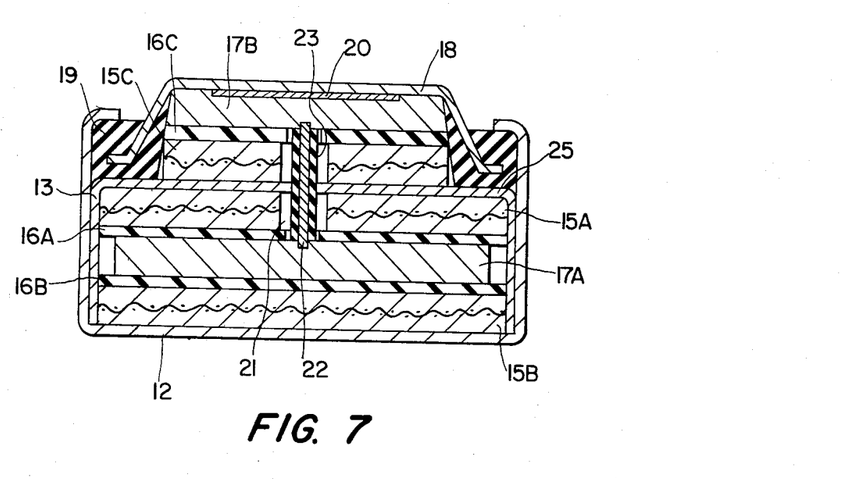
FIG. 7 is a section view of a forth embodiment of the present invention.
Figure 8:
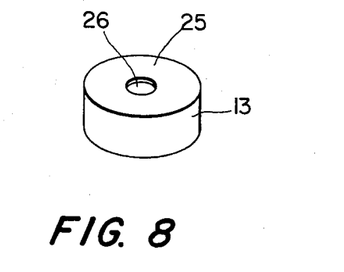
FIG. 8 is a perspective view of a conductive case.

A forth embodiment of the present invention will be discussed by referring to FIGS. 7 to 9.

This forth embodiment differs from the third embodiment shown in FIG. 5, in the following points.

In the third embodiment above-mentioned, the conductive case 13 is provided with the flange 14 the width of which is formed rather narrow, and the conductive plate 24 is used for providing electrical contact between the first and third positive electrodes 15A and 15C. In this forth embodiment, however, a relatively wide flange 25 is disposed at the periphery of one opening of the conductive case 13 and a central bore 26 is defined in this flange, and the cylindrical insulating member 23 above-mentioned is pressingly inserted into and fixed to this central bore 26. This insulating member 23 is also passed through the central bores 21 in the third positive electrode 15C and the separator 16C at the upper portion of the insulating member 23, and the central bores 21 in the first positive electrode 15A and the separator 16A at the lower portion of the insulating member 23. It is to be noted that the electrical contact member 22 is pressingly inserted into this insulating member 23.

Figure 9:
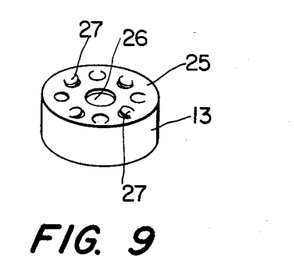
FIG. 9 is a perspective view of another form of a conductive case.

As shown in FIG. 9, projections 27 may be formed at the both surfaces of the flange 25. These projections 27 are forcibly entered into the positive electrodes 15C and 15A disposed on and under the flange 25, whereby the current collecting effect is improved.

Provision of such wide flange 25 at the edge of one opening of the conductive case 13 may therefore cause two electrodes disposed on and under the flange 25, to be electrically connected to each other. In addition, press-insertion of the insulating member 23 into the central bore 26 in the flange 25 of the conductive case 13 may improve the battery assembling efficiency. Furthermore, the projections 27 at both surfaces of the flange 25 may provide good electrical contact between the electrodes 15A and 15C having a same polarity which are disposed on and under the flange 25.

Figure 10:
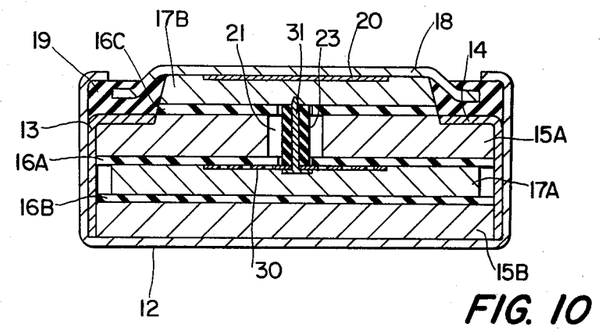
FIG. 10 is a section view of a fifth embodiment of the present invention.
Figure 11:
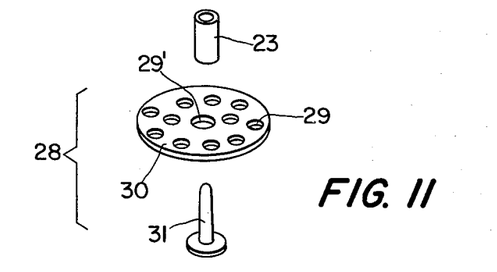
FIG. 11 is a disassembled perspective view of an electrical contact member used in the battery shown in FIG. 10.

A fifth embodiment of the present invention will be discussed by referring to FIGS. 10 and 11.

This fifth embodiment differs from the second embodiment shown in FIG. 3, in the following points.

In the second embodiment, the electrical contact member 22 is formed of a single rod. In the fifth embodiment, however, as shown in FIG. 11 an electrical contact member 28 comprises a conductive plate 30 provided with a plurality of bores 29 and a thumbtack-shape conductive pin 31, which is connectingly inserted into the central bore 29' in the conductive plate 30, this conductive pin 31 being provided at the external circumferential surface thereof with the insulating member 23.

When the conductive plate 30 is press-contacted to the first negative electrode 17A so that the conductive plate 30 be pressingly entered into the first negative electrode 17A, the conductive plate 30 constituting the electrical contact member 28 becomes in contact with the first negative electrode 17A in a large area, thereby to reduce the contact resistance and to enhance the current collecting effect.

Furthermore, in this fifth embodiment the positioning of the electrical contact member 28 may be made in an easier way, whereby the assembling efficiency is improved.

Figure 12:
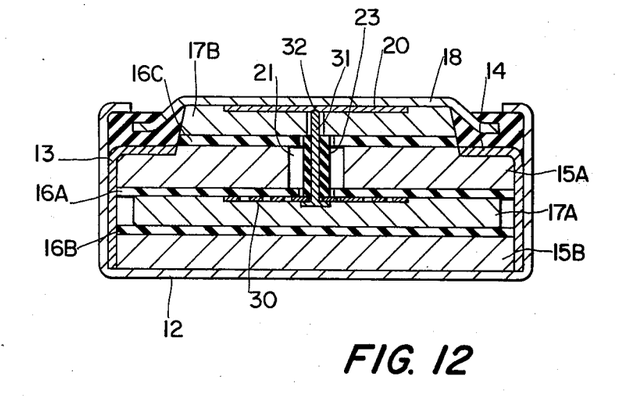
FIG. 12 is a section view of a sixth embodiment of the present invention.

A sixth embodiment of the present invention will be discussed by referring to FIG. 12.

This sixth embodiment differs from the fifth embodiment shown in FIG. 10, in the following points.

In the fifth embodiment, the upper end of the conductive pin 31 of the electrical contact member 28 is press-contacted to the second negative electrode 17B. In this sixth embodiment, however, as shown in FIG. 12 the central bore 21 is defined also in the second negative electrode 17B which is contact-pressed to the inner surface of the closure cover 18 through the negative electrode collector net 30, and the conductive pin 31 is passed also through this central bore 21 in the second negative electrode 17B. The tip 32 of the conductive pin 31 is then spot-welded to the negative electrode collector net 20. Such spot-welding may reduce the contact resistance to enhance the current collecting effect.

A seventh embodiment of the present invention will be discussed by referring to FIGS. 13 and 14.

This seventh embodiment differs from the sixth embodiment shown in FIG. 12, in the following points.

In the sixth embodiment, the tip 32 of the conductive pin 31 of the electrical contact member 28 is spot-welded to the negative electrode collector net 20. In this seventh embodiment, however, a second conductive pin 31' having a shape substantially similar as that of the conductive pin 31, is securely fixed to the inner surface of the closure cover 18 together with the negative electrode collector net 20 by a spot-welding. The second conductive pin 31' is passed through the second negative electrode 17B, which is press-contacted to the concaved space of the closure cover 18, so that the lower end of the second conductive pin 31' is projected from the second negative electrode 17B.

Figure 14:
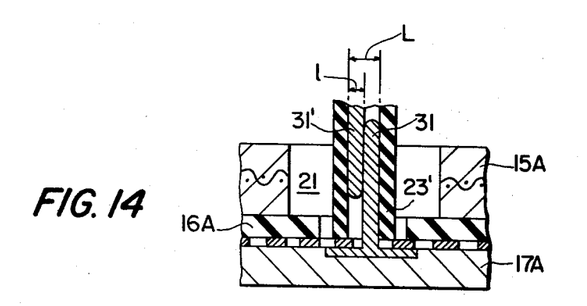
FIG. 14 is an enlarged section view of portions of the battery shown in FIG. 13.

As shown in FIG. 14 the inner diameter L of the cylindrical insulating member 23' is slightly smaller than the total of the outer diameters 1 of the conductive pins 31 and 31'. The conductive pins 31 and 31' are inserted into the insulating member 23' from each of the openings thereof, respectively, and within the insulating member 23' the conductive pins 31 and 31' are overlapped and press-contacted to each other, whereby electrical contact is provided between the conductive pins 31 and 31'.

In such arrangement, the conductive pins 31 and 31' projected from the first and second negative electrodes 17A and 17B are press-contacted to each other within the insulating member 23', whereby more secure electrical contact is provided between the conductive pins 31 and 31'.

Figure 15:
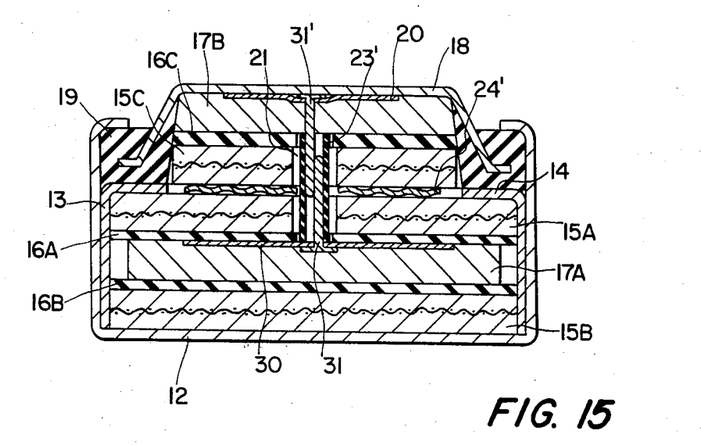
FIG. 15 is a section view of an eighth embodiment of the present invention.

An eighth embodiment of the present invention will be discussed by referring to FIGS. 15.

Figure 13:
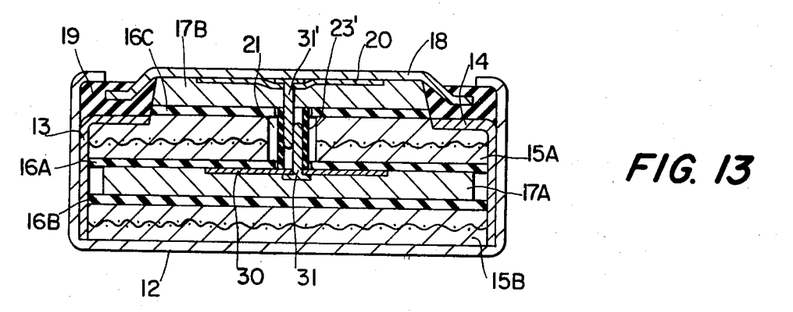
FIG. 13 is a section view of a seventh embodiment of the present invention.

This eighth embodiment is one in which the seventh embodiment shown in FIG. 13 is being applied to the third embodiment shown in FIG. 5. Namely, in this eighth embodiment, as shown in FIG. 15, a third positive electrode 15C is disposed on the first positive electrode 15A through a conductive plate 24', thereby to provide more secure electrical contact between the first and second negative electrodes 17A and 17B, likely the seventh embodiment.

What is claimed is:

1. A battery characterized in that:
   between a pair of electrodes having one polarity, an electrode having the other polarity is interposed, with separator layers therebetween,
   central bores are defined in said separator layers and said electrode having said other polarity,
   an electrical contact member is passed through said central bores,
   an insulating member is disposed between said electrical contact member and said electrode having said other polarity, and
   each of both end surfaces of said electrical contact member is press-contacted with each of the opposite surfaces of said pair of electrodes having said one polarity,
   whereby said pair of electrodes having said one polarity are electrically connected to each other by means of said electrical contact member.

2. A battery as set forth in claim 1, wherein said electrodes having one polarity have large diameters and said electrode having said other polarity has a small diameter, and wherein said electrodes are disposed in a cylindrical conductive case such that said large diameter electrodes are closely fitted into said cylindrical conductive case and are electrically connected to said cylindrical conductive case.

3. A battery characterized in that
   a small diameter electrode having one polarity is interposed between two large diameter electrodes having the other polarity, with separator layers therebetween,
   thus superposed small and large diameter electrodes are then disposed in a cylindrical conductive case such that said large diameter electrodes are closely fitted into said cylindrical conductive case, thereby to be electrically connected to said cylindrical conductive case,
   a concaved space is defined by disposing an insulating packing at the periphery of the closure cover of a battery vessel,
   within said concaved space there are disposed an electrode having said other polarity at the lower portion of said concaved space and an electrode having said one polarity at the upper portion of said concaved space, with an separator layer therebetween,
   provision is made so that said upper large diameter electrode disposed in said cylindrical conductive case is electrically connected to said electrode having said other polarity disposed within said concaved space of said closure cover,
   central bores are defined in said electrodes having said other polarity to be thus electrically connected and in said separator layers disposed at the both sides of said electrodes having said other polarity to be thus electrically connected, and
   an electrical contact member is passed through said central bores whereby said small diameter electrode disposed in said cylindrical conductive case is electrically connected to said electrode having said one polarity disposed in said closure cover, by means of said electrical contact member.

4. A battery as set forth in claim 3, wherein
   said cylindrical conductive case simultaneously forms a collector member having said other polarity and is fitted into said battery vessel simultaneously forming the terminal of said other polarity, and
   said battery vessel is closed by said closure cover simultaneously forming the terminal of said one polarity, through said insulating packing.

5. A battery as set forth in claim 3, wherein
   said small diameter electrode is formed with lithium used as active material, and
   said large diameter electrodes are formed with manganese dioxide used as active material.

6. A battery as set forth in claim 3, wherein
   a flange is disposed at said cylindrical conductive case, and
   the electrodes having said other polarity are disposed on and under said flange whereby said electrodes having said other polarity are electrically connected to each other by said flange.

7. A battery as set forth in claim 6, wherein projections are formed at the both surfaces of said flange of said cylindrical conductive case.

8. A battery comprising:
   large diameter electrodes having one polarity positioned on each side of a small diameter electrode having the other polarity, with separator layers positioned between each of said large diameter electrodes and said small diameter electrodes,
   said electrodes being disposed within a cylindrical conductive inner case which simultaneously forms a collector member of said one polarity said inner case being fitted into a battery vessel which simultaneously forms a terminal of said one polarity said inner case being electrically connected to said battery vessel, such that said large diameter electrodes are closely fitted into and electrically connected to said cylindrical conductive inner case, said electrodes being positioned such that an electrode having said other polarity is superposed on an upper electrode of said large diameter electrodes in said cylindrical conductive inner case, with a separator layer therebetween, an electrical contact member positioned within a central bore defined in said upper large diameter electrode and said separator layer, said contact member electrically connecting said small diameter electrode and said electrode having said other polarity;

an insulating member disposed between said upper large diameter electrode and said electrical contact member;

an insulating packing forming a closure cover for said battery vessel which simultaneously forms a terminal of said other polarity and is connected to said electrode having said other polarity.

9. A battery as set forth in any one of claims 1, 8 or 3, wherein said electrodes having said one polarity to be electrically connected to each other by means of said electrical contact member are made of soft and light metal plate, for example lithium, magnesium or sodium, and the ends of said electrical contact member are forcibly entered into said electrodes having said one polarity, respectively, whereby said electrodes having said one polarity are electrically connected to each other by means of said electrical contact member.

10. A battery as set forth in any one of claims 8 or 3, wherein said electrical contact member comprises a conductive plate in contact with at least one of said electrodes having said one polarity, and a conductive pin for electrically connecting said electrodes having said one polarity to each other.

11. A battery as set forth in any one of claims 8 or 3, wherein said electrical contact member comprises a pair of conductive pins, each projecting into each of the facing surfaces of said electrodes having said one polarity, central bores are defined in said electrode having said other polarity and said separator layers which are interposed said electrodes having said one polarity, a cylindrical insulating member is inserted into said central bores, and within the inner space of said insulating member said pair of conductive pins are press-contacted with and electrically connected to each other.

12. A battery as set forth in claim 8, wherein a central bore is formed in the upper electrode having said other polarity in the cylindrical conductive inner case, an electrical contact member one end of which is electrically connected to said small diameter electrode in said cylindrical conductive inner case, is passed through said central bore, and the other end of said electrical contact member is electrically connected to said closure cover.

13. A battery characterized in that an electrode having one polarity is sandwiched by electrodes having the other polarity, with separator layers therebetween, a closure cover for a battery vessel is disposed on the upper electrode having said other polarity, through an insulating plate, central bores are formed in said upper electrode having said other polarity and said insulating plate and the separator layer respectively disposed on and below said upper electrode having said other polarity, an electrical contact member is passed through said bores, an insulating member is disposed between said electrical contact member and said upper electrode having said other polarity, the upper end surface of said electrical contact member is electrically connected to said closure cover, and the lower end surface of said electrical contact member is press-contacted onto the upper surface of said electrode having said one polarity.

14. A battery as set forth in claim 13, wherein the electrode having said one polarity has a small diameter and the electrode having said other polarity have large diameters, and thus formed electrode group is disposed in a cylindrical conductive case such that said large diameter electrodes are closely fitted into said cylindrical conductive case thereby to be electrically connected to said cylindrical conductive case.

15. A battery as set forth in claim 14, wherein the cylindrical conductive case is fitted into the battery vessel simultaneously forming the terminal of said other polarity to be electrically connected thereto.

16. A battery as set forth in claim 15, wherein a concaved space is defined by disposing an insulating packing at the periphery of the closure cover, an electrode having said one polarity is disposed within said concaved space, a central bore is formed in said electrode having said one polarity disposed within said concaved space, and an electrical contact member is passed through said central bore, whereby the small diameter electrode in said cylindrical conductive case, said electrode disposed within said concaved space and said closure cover are electrically connected to each other, by means of said electrical contact member.

* * * * *

UNITED STATES PATENT AND TRADEMARK OFFICE
CERTIFICATE OF CORRECTION

PATENT NO. : 4,226,925
DATED : October 7, 1980
INVENTOR(S) : HIRONOSUKE IKEDA ET AL It is certified that error appears in the above-identified patent and that said Letters Patent are hereby corrected as shown below:

On the first page of the patent, following "[30] Foreign Application Priority Data", the first entry should be deleted ("Mar. 8, 1978[JP] Japan ... 53-80558[U]").

Please insert therefor:

--Mar. 8, 1978[JP] Japan ... 53-30558[U]--

Signed and Sealed this

Twenty-fourth Day of February 1981

[SEAL]

Attest:

RENE D. TEGTMEYER

Attesting Officer

Acting Commissioner of Patents and Trademarks